United States Patent
Yang

(10) Patent No.: US 10,331,273 B2
(45) Date of Patent: Jun. 25, 2019

(54) TOUCH DISPLAY SYSTEM, TOUCH DEVICE AND TOUCH DISPLAY METHOD FOR AVOIDING MISJUDGING OF TOUCH POSITION

(71) Applicant: Coretronic Corporation, Hsin-Chu (TW)

(72) Inventor: Chung-Lung Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/132,260

(22) Filed: Apr. 19, 2016

(65) Prior Publication Data

US 2017/0003826 A1 Jan. 5, 2017

(30) Foreign Application Priority Data

Jun. 30, 2015 (CN) .......................... 2015 1 0385834

(51) Int. Cl.
  *G06F 3/037* (2013.01)
  *G06F 3/042* (2006.01)
  *G06F 3/041* (2006.01)
  *G06F 3/0354* (2013.01)
  *G06F 3/033* (2013.01)

(52) U.S. Cl.
  CPC ........ *G06F 3/0421* (2013.01); *G06F 3/03542* (2013.01); *G06F 3/042* (2013.01); *G06F 3/0416* (2013.01); *G06F 3/0425* (2013.01)

(58) Field of Classification Search
  CPC .... G06F 3/03542; G06F 3/0416; G06F 3/042; G06F 3/0421; G06F 3/0425

USPC ........................................ 345/180; 178/19.05
See application file for complete search history.

(56) References Cited

U.S. PATENT DOCUMENTS

| 8,772,703 B2 | 7/2014 | Kiyose et al. | |
| 2005/0073508 A1* | 4/2005 | Pittel | G06F 3/03545 345/175 |
| 2008/0169132 A1* | 7/2008 | Ding | G06F 3/03545 178/19.02 |

(Continued)

FOREIGN PATENT DOCUMENTS

| CN | 102436327 | 5/2012 |
| CN | 102914937 | 2/2013 |

(Continued)

OTHER PUBLICATIONS

Office Action of China Counterpart Application, dated Sep 3, 2018, pp. 1-10.

*Primary Examiner* — Adam J Snyder
(74) *Attorney, Agent, or Firm* — JCIPRNET

(57) ABSTRACT

A touch display system, a touch device and a touch display method are provided. A first touch tool and a second touch tool are communicated with to determine whether the first touch tool and the second touch tool are enabled within an enable area. When at least one of the first touch tool and the second touch tool is enabled within the enable area, a touch light curtain generating unit is controlled to stop generating a light curtain. When the first touch tool and the second touch tool are all enabled, the first touch tool and the second touch tool are controlled to sequentially emit invisible lights, so as to determine touch positions of the first touch tool and the second touch tool, by which misjudgment of the touch positions is effectively avoided.

26 Claims, 5 Drawing Sheets

(56) References Cited

U.S. PATENT DOCUMENTS

| | | | | |
|---|---|---|---|---|
| 2013/0135260 A1* | 5/2013 | Damhaug | ............. | G06F 3/0304 |
| | | | | 345/175 |
| 2013/0257782 A1* | 10/2013 | Nakagawa | .......... | G06F 3/03542 |
| | | | | 345/173 |
| 2013/0314380 A1* | 11/2013 | Kuribayashi | ......... | G06F 3/0425 |
| | | | | 345/175 |
| 2014/0146016 A1* | 5/2014 | Lu | ........................ | G06F 3/0421 |
| | | | | 345/175 |
| 2014/0313166 A1* | 10/2014 | Rattray | ................ | G06F 3/0354 |
| | | | | 345/175 |

FOREIGN PATENT DOCUMENTS

| | | | | |
|---|---|---|---|---|
| CN | 103064562 | | 4/2013 | |
| CN | 202929578 | | 5/2013 | |
| CN | 103226411 | | 7/2013 | |
| JP | 2014149643 | | 8/2014 | |
| TW | 201413366 | | 4/2014 | |
| TW | 201419052 | | 5/2014 | |
| WO | WO 2013/104061 A1 * | | 7/2013 | ............. G06F 3/042 |

* cited by examiner

TOUCH DISPLAY SYSTEM, TOUCH DEVICE AND TOUCH DISPLAY METHOD FOR AVOIDING MISJUDGING OF TOUCH POSITION

CROSS-REFERENCE TO RELATED APPLICATION

This application claims the priority benefit of China application serial no. 201510385834.3, filed on Jun. 30, 2015. The entirety of the above-mentioned patent application is hereby incorporated by reference herein and made a part of this specification.

BACKGROUND

Technical Field

The invention relates to an electronic device. Particularly, the invention relates to a touch display system, a touch device and a touch display method.

Related Art

In recent years, touch electronic products are well received by consumers due to operation convenience and high intuition thereof, and gradually become a main stream in the market. In the conventional resistive, capacitive and rear projection type touch screens, the capacitive touch screens have the best touch effect, though the capacitive touch screens also have the highest cost, and the cost is increased along with increase of a screen size, which limits the application of the capacitive touch screens.

In order to seek an alternative solution of the capacitive touch screen, an optical touch screen using an optical lens to detect a touch position is developed, which has advantages of low cost and good accuracy, etc., and is competitive in the market, so that the optical touch screen has become another option of the large size touch screen.

For example, an infrared light source can be set at periphery of a liquid crystal display (LCD) panel or a projection screen, and the infrared light source is used to form an optical touch area in front of the LCD panel or the projection screen. Moreover, by capturing a light spot formed on a touch object by reflecting light, a position of the touch object can be determined. Alternatively, by detecting a stylus capable of emitting an infrared light, a position of the stylus can be determined. Although the aforementioned methods can effectively provide a touch function to a large size touch screen, since many infrared lights may stray in an application environment, the known optical touch device cannot distinguish whether the captured infrared light is the infrared light in the environment or the light spot formed on the touch object by reflecting the light, or an infrared light spot emitted by the stylus, so that it is easy to cause a wrong judgement of the touch position. Moreover, in case that a plurality of touch styluses is simultaneously used, the known optical touch device cannot distinguish the infrared light spot compounding to each of the styluses, so that the touch position of each of the styluses cannot be correctly determined.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a touch display system, a touch device and a touch display method capable of effectively avoiding misjudging of a touch position.

Other objects and advantages of the invention can be further illustrated by the technical features broadly embodied and described as follows.

In order to achieve one or a portion of or all of the objects or other objects, an embodiment of the invention provides a touch display system including a display surface, a touch light curtain generating unit, a first touch tool, a second touch tool, an image capturing unit, a communication unit and a processing unit. The touch light curtain generating unit generates a light curtain parallel to the display surface to form a touch area. The first touch tool emits an invisible light when the first touch tool performs a touch operation in the touch area. The second touch tool emits an invisible light when the second touch tool performs a touch operation in the touch area. The image capturing unit captures images of the touch area when at least one of the first touch tool and the second touch tool emits the invisible light, so as to generate a plurality of first capturing images. The processing unit is coupled to the touch light curtain generating unit, the image capturing unit and the communication unit, and communicates with the first touch tool and the second touch tool through the communication unit, so as to determine whether at least one of the first touch tool and the second touch tool is enabled within an enable area, wherein when at least one of the first touch tool and the second touch tool is enabled within the enable area, the processing unit controls the touch light curtain generating unit to stop generating the light curtain, and controls the first touch tool and the second touch tool through the communication unit to sequentially emit the invisible lights when the touch tools are enabled, and determines touch positions of the touch tools according to the first capturing images obtained when the touch tools emit the invisible lights.

The touch display method includes following steps. A light curtain parallel to the display surface is generated to form a touch area. A first touch tool and a second touch tool are communicated with to determine whether at least one of the first touch tool and the second touch tool is enabled within the enable area. When at least one of the first touch tool and the second touch tool is enabled within the enable area, a touch light curtain generating unit is controlled to stop generating the light curtain. When the touch tools are enabled, the touch tools are controlled to sequentially emit invisible lights, and images of the touch area are captured to generate a plurality of first capturing images. Touch positions of the touch tools are determined according to the first capturing images obtained when the touch tools emit the invisible lights.

The invention provides a touch device configured to detect touch positions of a first touch tool and a second touch tool in a touch area. The touch device includes an image capturing unit and a communication unit. The image capturing unit captures images of the touch area when at least one of the first touch tool and the second touch tool emits an invisible light, so as to generate a plurality of first capturing images. The communication unit communicates with the first touch tool and the second touch tool to determine whether the first touch tool and the second touch tool is enabled in an enable area, when at least one of the first tool and the second tool is enabled in the enable area, the communication unit sends a control signal to the enabled touch tools to control the touch tools to sequentially emit the invisible lights, and the image capturing units captures the invisible lights emitted by the touch tools to generate the corresponding first capturing images, wherein the first capturing images obtained when the touch tools emit the invisible lights are used for determining touch positions of the touch tools.

According to the above descriptions, in the embodiment of the invention, by communicating with the first touch tool and the second touch tool, it is determined whether at least one of the first touch tool and the second touch tool is enabled within the enable area. When at least one of the first touch tool and the second touch tool is enabled within the enable area, the touch light curtain generating unit is controlled to stop generating the light curtain, and when the touch tools are enabled, the touch tools are controlled through the communication unit to sequentially emit the invisible lights, so as to determine the touch positions of the touch tools, by which misjudgement of the touch positions is effectively avoided.

Other objectives, features and advantages of the present invention will be further understood from the further technological features disclosed by the embodiments of the present invention wherein there are shown and described preferred embodiments of this invention, simply by way of illustration of modes best suited to carry out the invention.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
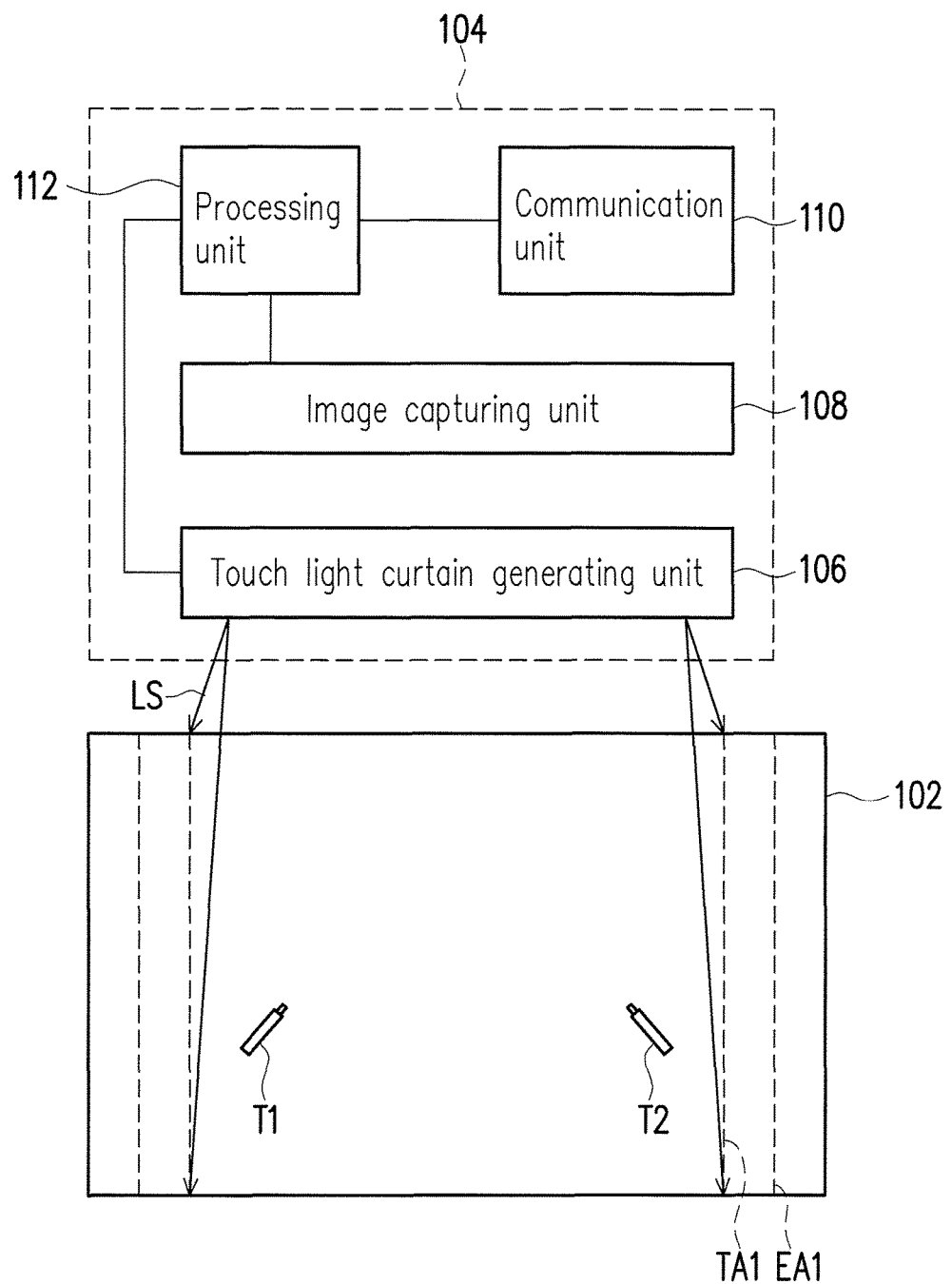
FIG. 1 is a schematic diagram of a touch display system according to an embodiment of the invention.

FIG. 1 is a schematic diagram of a touch display system according to an embodiment of the invention. Referring to FIG. 1, the touch display system 100 includes a display surface 102, a touch device 104 and touch tools T1, T2, where the touch device 104 may include a touch light curtain generating unit 106, an image capturing unit 108, a communication unit 110 and a processing unit 112. The touch light curtain generating unit 106 is, for example, but not limited to an infrared light-emitting diode (IR LED) or an IR laser assembly, though the invention is not limited thereto, and by using an optical assembly, for example, a lens or a reflector, the invisible light emitted by the IR LED or the IR laser assembly may form a light curtain of a predetermined region. The image capturing unit 108 is, for example, but not limited to a charge-coupled device (CCD), a complementary metal-oxide semiconductor (CMOS) or an IR camera, etc. The communication unit 110, for example, but is not limited to adopt bluetooth, Wi-Fi, Zigbee or other wireless transmission interface to implement signal transmission, and is not limited to adopt optical fiber or other wired transmission interface to implement the signal transmission. The processing unit 112 is, for example, but not limited to a desktop computer, a notebook or a microprocessor, or a chipset, etc., capable of operating independently, and the processing unit 112 is coupled to the touch light curtain generating unit 106, the image capturing unit 108 and the communication unit 110. The display surface 102 is, for example, but not limited to a display screen of a liquid crystal display (LCD) device, or a projection screen or a wall suitable for displaying projection images. The touch tool T1 and the touch tool T2 are, for example, respectively a stylus capable of emitting an invisible light (for example, an infrared light, though the invention is not limited thereto) and having a wireless communication function (for example, through bluetooth, Wi-Fi, Zigbee or other wireless transmission interface), and when the touch tool T1 and the touch tool T2 perform touch operations in a touch area TA1 (for example, to contact the display surface 102), the touch tool T1 and the touch tool T2 can emit the aforementioned invisible lights. The touch light curtain generating unit 106 is used for generating a light curtain LS parallel to the display surface 102 to form the touch area TA1. The light curtain LS is, for example, implemented by adopting an invisible light (for example, an infrared laser light, though the invention is not limited thereto). In the embodiment, an area of the touch area TA1 is slightly smaller than an area of the display surface 102, though in other embodiments, a magnitude of the area of the touch area TA1 can be adjusted according to an actual requirement, which is not limited by the invention.

The image capturing unit 108 may capture images of the touch area TA1 when at least one of the touch tool T1 and the touch tool T2 emits the invisible light, so as to generate first capturing images. The touch tools T1 and T2 can be communicatively coupled to the communication unit 110, and the processing unit 112 may communicate with the touch tool T1 and the touch tool T2 through the communication unit 110, so as to determine whether at least one of the touch tool T1 and the touch tool T2 is enabled within an enable area EA1. When at least one of the touch tool T1 and the touch tool T2 is enabled within the enable area EA1, the processing unit 112 controls the touch light curtain generating unit 106 to stop generating the light curtain LS by a predetermined time (for example, several milliseconds), and when the touch tools are enabled, the processing unit 112 sends a signal through the communication unit 110 to control the enabled touch tools to sequentially emit the invisible lights, and determines touch positions of the enabled touch tools according to the first capturing images obtained when the enabled touch tools emit the invisible lights. Moreover, related techniques of the stylus applied in the embodiment are already known by those skilled in the art, and details thereof are not repeated.

For example, as shown in FIG. 1, when the touch tool T1 and the touch tool T2 are all in the enable area EA1, the touch tool T1 and the touch tool T2 are all enabled to emit the invisible lights. Now, within the predetermined time, the touch light curtain generating unit 106 stops generating the light curtain LS. Then, the processing unit 112 sends a signal through the communication unit 110 to control the touch tool T1 and the touch tool T2 to sequentially emit the invisible lights, and determines touch positions of the touch tool T1 and the touch tool T2 on the touch area TA1 according to the first capturing images obtained by the image capturing unit 108 when the touch tool T1 and the touch tool T2 sequentially emit the invisible lights. In this way, the processing unit 112 may communicate with the touch tool T1 and the touch tool T2 through the communication 110 to determine an enable state of the touch tool T1 and the touch tool T2, and compares a variation of light spots in the first capturing images obtained when the touch tool T1 and the touch tool T2 emit the invisible lights to correctly determine the touch positions of the touch tool T1 and the touch tool T2, so as to effectively avoid misjudging the touch positions. Moreover, in the present embodiment, the enable area EA1 covers the touch area TA1, and the light curtain LS is located within the enable area EA1, though in same embodiments, the magnitude of the enable area EA1 can be adjusted according to an actual requirement, which is not limited by the invention.

Figure 2:
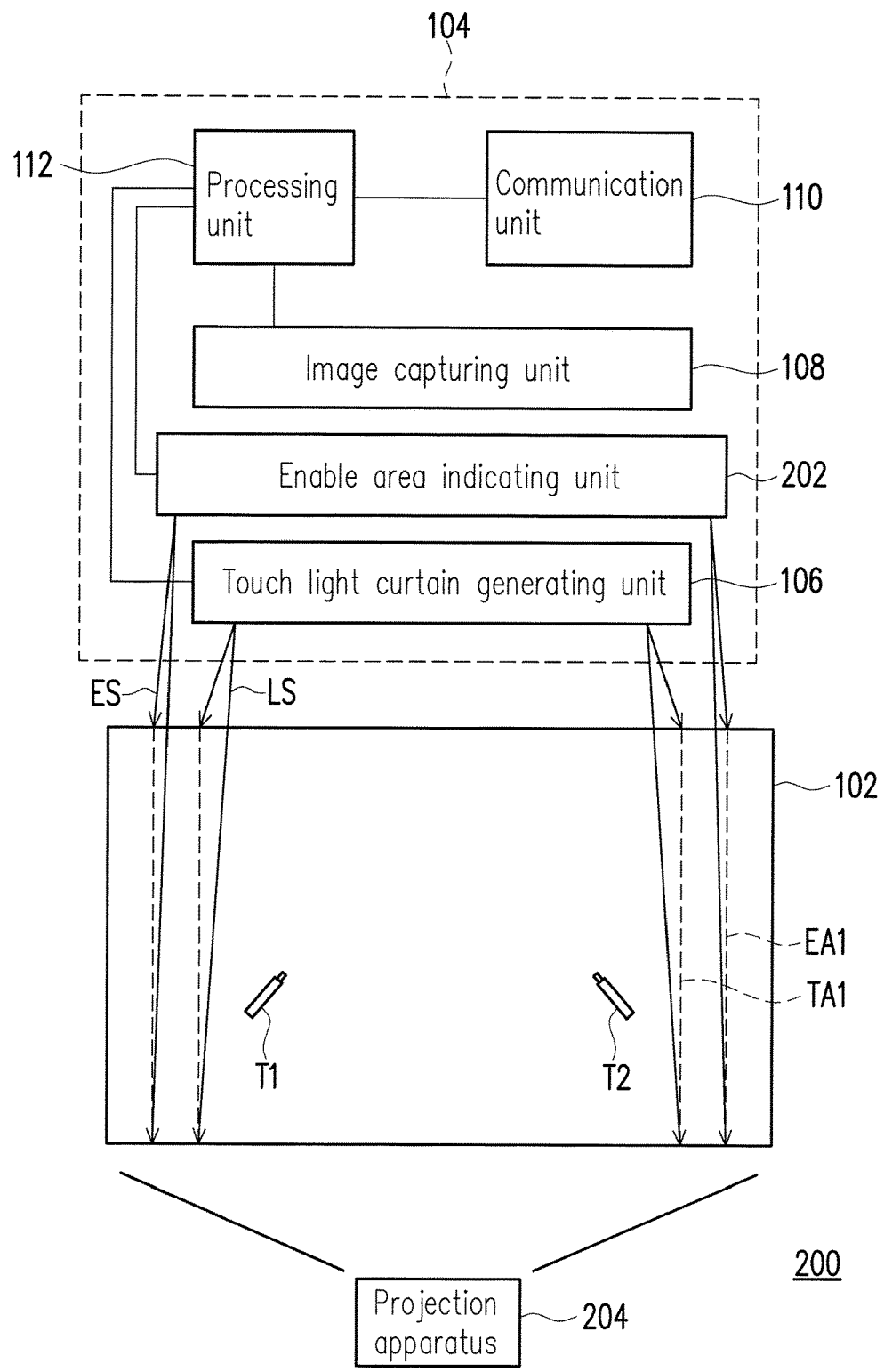
FIG. 2 is a schematic diagram of a touch display system according to another embodiment of the invention.

FIG. 2 is a schematic diagram of a touch display system according to another embodiment of the invention. Referring to FIG. 2, the touch display system 200 of the present embodiment further includes an enable area indicating unit 202. Further, the enable area EA1 can be provided by the enable area indicating unit 202. The enable area indicating unit 202 is, for example, an invisible light generator, which is coupled to the processing unit 112, and generates an enable indicating beam ES (for example, an infrared light), so as to form the enable area EA1. Namely, an irradiation range of the enable indicating beam ES is the enable area EA1. Moreover, the touch display system 200 of the present embodiment further includes a projection apparatus 204, and the projection apparatus 204 is adapted to project images to the display surface 102 for displaying. Moreover, it should be noted that the light curtain LS generated by the touch light curtain generating unit 106 and the invisible light provided by the enable area indicating unit 202 are, for example, infrared lights with different wavelengths or frequencies for distinction.

Figure 3:
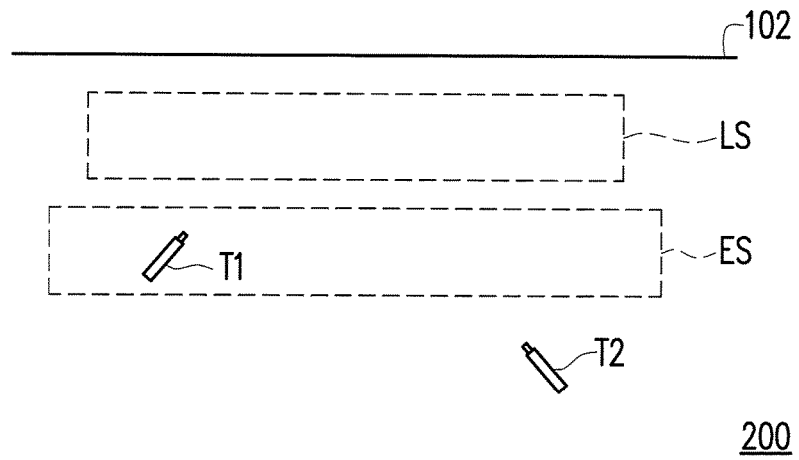
FIG. 3 is a top view of a configuration of a display surface, a light curtain and an enable indicating beam in the touch display system of FIG. 2.

FIG. 3 is a top view of a configuration of the display surface, the light curtain and the enable indicating beam in the touch display system 200 of FIG. 2. Referring to FIG. 2 and FIG. 3, a configuration position of the light curtain LS generated by the touch light curtain generating unit 106 is, for example, between the enable indicating beam ES generated by the enable area indicating unit 202 and the display surface 102. Therefore, when the touch tool touches or writes on the display surface 102, before the touch tool enters an irradiation range of the light curtain LS, the touch tool has to enter the irradiation range of the enable indicating beam ES (i.e. the enable area EA1) first. It should be noticed that the irradiation range of the enable indicating beam ES is not limited to the embodiment of FIG. 3, and a size, shape or position thereof can be adjusted according to an actual requirement. In another embodiment, the position of the enable indicating beam ES can be coincided with the position of the light curtain LS.

It is determined whether at least one of the touch tool T1 and the touch tool T2 is located in the enable area EA1 according to whether the touch tool T1 and the touch tool T2 receive the enable indicating beam ES, and when the touch tool T1 and the touch tool T2 are located in the enable area EA1, the touch tool T1 and the touch tool T2 are enabled. For example, the touch tool T1 of FIG. 3 can be enabled as the touch tool T1 enters the irradiation range of the enable indicating beam ES, and the touch tool T2 is not enabled as the touch tool T2 is located outside the irradiation range of the enable indicating beam ES. In other embodiments, the touch tool T1 and the touch tool T2 may respectively have a switch, and when the touch tool T1 and/or the touch tool T2 enter the enable area EA1, in case that the switches are turned on, the touch tool T1 and/or the touch tool T2 may emit the invisible lights when the touch tool T1 and/or the touch tool T2 perform touch operations. Conversely, when the touch tool T1 and/or the touch tool T2 enter the enable area EA1, in case that the switches are not turned on, the touch tool T1 and/or the touch tool T2 cannot emit the invisible lights when the touch tool T1 and/or the touch tool T2 perform touch operations, where the switch of the touch tool is, for example, a button set on the touch tool, or the touch tool is a stylus, and the switch is a pressure sensor, etc., disposed at a tip of the stylus, though the invention is not limited thereto. Moreover, if the touch tool T1 and/or the touch tool T2 are not in the enable area EA1, regardless whether the switches are turned on, the touch tool T1 and/or the touch tool T2 cannot emit the invisible lights. Besides, the enable indicating beam ES may selectively carry encoding information (for example, to adjust an emitting timing of the enable indicating beam ES), and after the touch tool T1 and the touch tool T2 receive the enable indicating beam ES, it is determined whether the touch tool T1 and the touch tool T2 are located in the enable area EA1 according to the encoding information, so as to avoid a situation that the touch tool T1 and the touch tool T2 are misjudged to enter the enable area EA1 due to that the touch tool T1 and the touch tool T2 receives other infrared light in the environment.

According to the above descriptions, when the touch tool T1 determines to enter the enable area EA1, the touch tool T1 notifies the processing unit 112 through the communication unit 110 that the touch tool T1 has entered the enable area EA1 and is enabled. The processing unit 112 then controls the touch light curtain generating unit 106 to stop generating the light curtain LS by a period of time, and determines a touch position of the touch tool T1 on the touch area TA1 according to the first capturing images (including the invisible light emitted by the touch tool T1 when the touch tool T1 performs the touch operation) captured by the image capturing unit 108.

It should be noted that in some embodiments, in order to further prevent other infrared lights in the environment from interfering determination of the touch positions, the processing unit 112 may control the touch tool T1 and the touch tool T2 to simultaneously stop emitting the invisible lights through the communication unit 110, and control the image capturing unit 108 to capture at least one second capturing images of the touch area TA1 when the touch tool T1 and the touch tool T2 stop emitting the invisible lights. The processing unit 112 can eliminate a background light source image of the touch area TA1 according to the second capturing images and the first capturing images obtained when the touch tool T1 and the touch tool T2 emit the invisible lights, so as to prevent the other infrared lights in the environment from influencing determination of the touch positions of the touch tool T1 and the touch tool T2, for example, each of the first capturing image can be compared with the second capturing images to eliminate the light spots in the background generated by the infrared lights, though the invention is not limited thereto.

Moreover, when the processing unit 112 determines that the touch tool T1 and the touch tool T2 are not within the enable area EA1 through the communication unit 110 and the touch tool T1 and the touch tool T2, the processing unit 112 may control the touch light curtain generating unit 106 to continually generate the light curtain LS. Now, other objects (for example, user's fingers) capable of reflecting the light curtain LS to produce light spots on the image capturing unit 108 can be used as touch objects. The image capturing unit 108 may capture the light spots generated by the touch objects by reflecting the light curtain LS to generate third capturing images including the reflected light spots, and the processing unit 112 may determine touch positions of the touch objects according to the third capturing images. It should be noted that a light wavelength of the light curtain LS is, for example, smaller than a light wavelength of the enable indicating beam ES, and a light intensity of the enable indicating beam ES is, for example, lower than a light intensity of the light curtain LS, so that when the touch light curtain generating unit 106 generates the light curtain LS, a situation that the touch tool reflects the enable indicating beam ES to generate a light spot to influence determination of the touch position is avoided. Moreover, the touch light curtain generating unit 106 only stops generating the light curtain LS by a period of time when at least one of the touch tool T1 and the touch tool T2 enters the enable area EA1, so as to determine the positions of the touch tools emitting the invisible lights in the enable area EA1, and then again generates the light curtain LS to recover a normal operation. In this way, besides that the touch tool T1 and the touch tool T2 capable of emitting the invisible lights can be simultaneously used in the touch area TA1 to perform the touch operations, other objects capable of reflecting the light curtain LS can also be simultaneously used to serve as the touch objects, i.e. the touch tool T1, the touch tool T2 and the other touch objects can be simultaneously used in the touch display system of the invention, so as to improve usage convenience of the touch display system.

Figure 4:
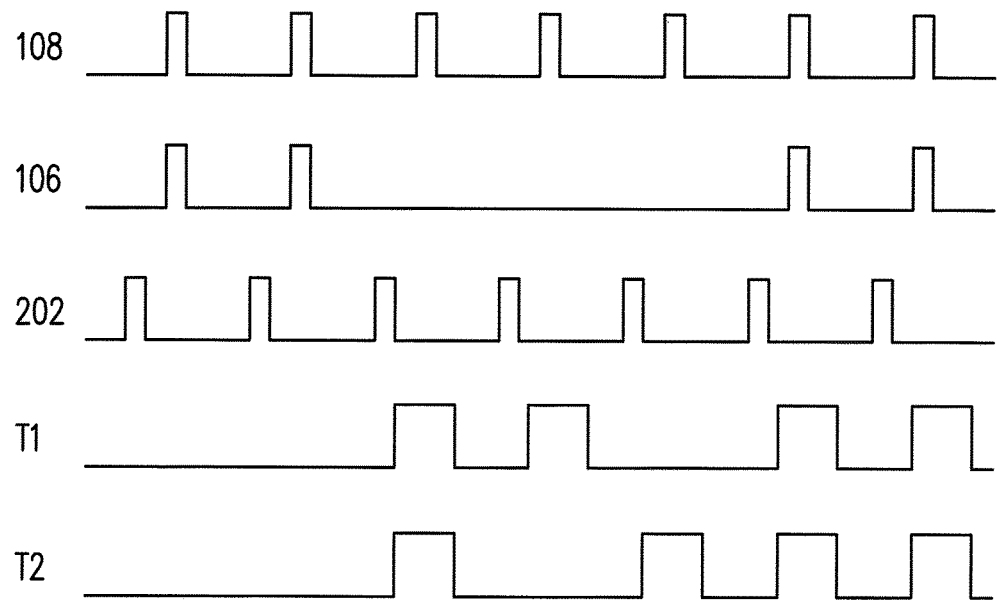
FIG. 4 is a schematic diagram illustrating operation timings of a touch light curtain generating unit, an image capturing unit, an enable area indicating unit and touch tools according to an embodiment of the invention.

FIG. 4 is a schematic diagram illustrating operation timings of the touch light curtain generating unit, the image capturing unit, the enable area indicating unit and the touch tools according to an embodiment of the invention. Referring to FIG. 2 and FIG. 4, in detail, the image capturing unit 108 may periodically capture the images of the touch area TA1 every predetermined time (for example, to capture the images during high level periods). In case that the touch light curtain generating unit 106 generates the light curtain LS, time periods for the touch light curtain generating unit 106 generating the light curtain LS can be synchronous to time periods for the image capturing unit 108 capturing images, by which power is saved, and determination of the touch positions is not influenced. Moreover, a time point for the enable area indicating unit 202 generating the enable indicating beam ES can be slightly earlier than a time point for the touch light curtain generating unit 106 generating the light curtain LS (i.e. as shown in FIG. 4, a time point for the enable area indicating unit 202 being transited to a high level is slightly earlier than a time point for the touch light curtain generating unit 106 being transited to the high level), so as to further prevent the enable indicating beam ES from influencing determination of the touch positions. Moreover, in case that the touch light curtain generating unit 106 stops generating the light curtain LS (i.e. the touch light curtain generating unit 106 is kept in a low level, as shown in FIG. 4), when the touch tools T1 and T2 enter the enable area EA1 and are enabled to perform touch operations, a period of the invisible lights emitted by the touch tools T1 and T2 may correspond to an image capturing period of the image capturing unit 108, where a time length for the touch tools T1 and T2 emitting the infrared lights can be slightly greater than a time length for the image capturing unit 108 capturing the images. Moreover, in order to facilitate the processing unit 112 determining the light spots corresponding to the touch tools T1 and T2 in the first capturing images, the processing unit 112 may respectively control the touch tools T1 and T2 to stop emitting the invisible lights in a specific time period through the communication unit 110. For example, as shown in FIG. 4, after the touch tool T2 is enabled, the touch tool T2 is controlled to stop emitting the invisible light during a second period where the invisible light is ought to be emitted, and the touch tool T1 is controlled to stop emitting the invisible light during a third period where the invisible light is ought to be emitted. After the processing unit 112 determines the light spots corresponding to the touch tools T1 and T2, the touch light curtain generating unit 106 may again generate the light curtain LS (for example, in FIG. 4, the touch light curtain generating unit 106 again generates the light curtain LS during the third period that the touch tool T1 emits the invisible light). Since the processing unit 112 can track a light spot moving trajectory of the touch tools T1 and T2 through the aforementioned method, after the touch light curtain generating unit 106 again produces the light curtain LS, even if other touch tools (for example, the user's fingers) reflect the light curtain LS generated by the touch light curtain generating unit 106 to generate the light spots, the processing unit 112 may identify the light spot corresponding to each of the touch tools without misjudging the touch positions of the touch tools.

Figure 5:
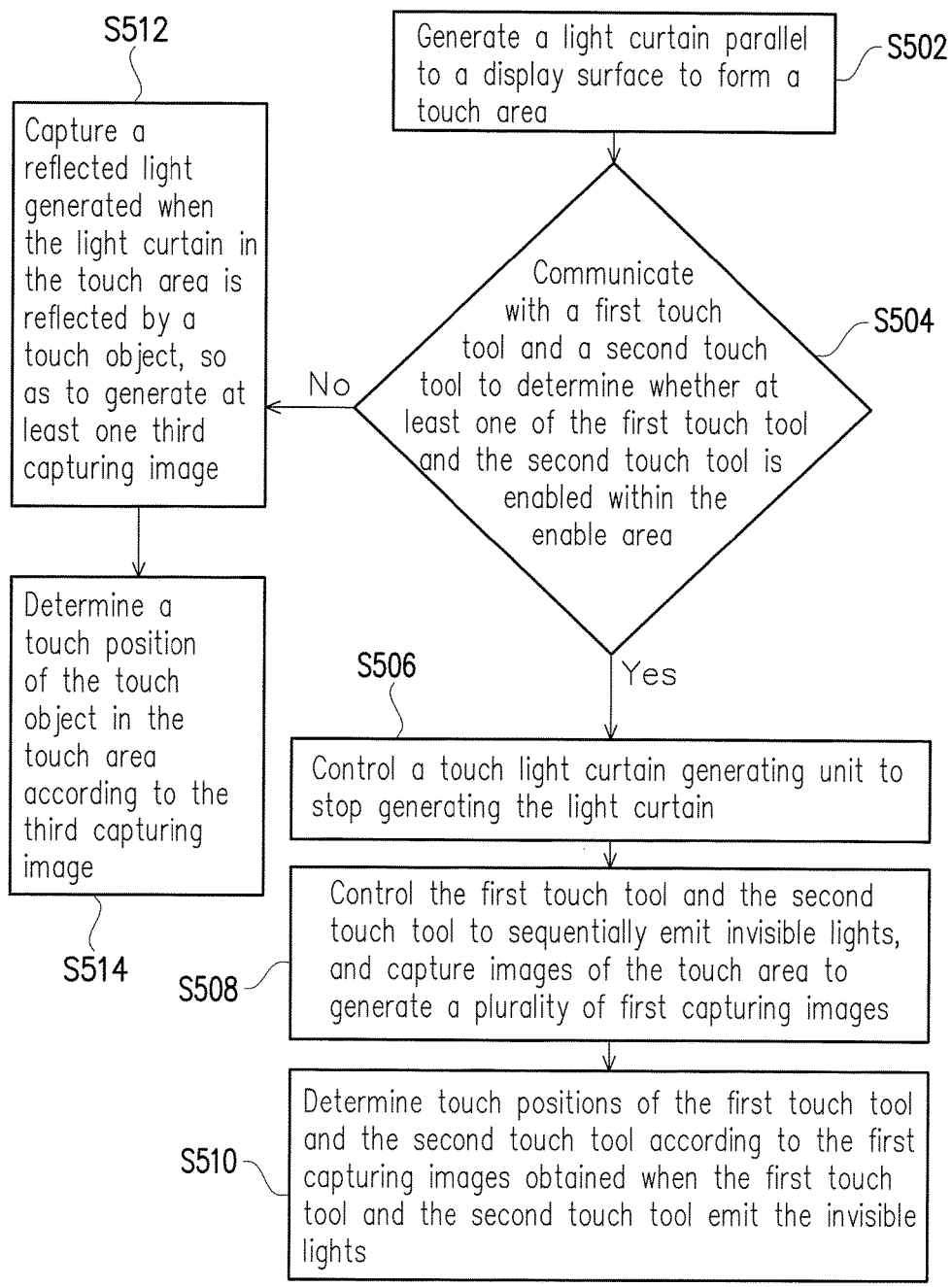
FIG. 5 is a flowchart illustrating a touch display method of a touch display system according to an embodiment of the invention.

FIG. 5 is a flowchart illustrating a touch display method of a touch display system according to an embodiment of the invention. Referring to FIG. 5, according to the aforementioned embodiments, the touch display method of the touch display system is deduced as follows. First, a light curtain parallel to the display surface is generated to form a touch area (step S502). Then, a first touch tool and a second touch tool are communicated with to determine whether at least one of the first touch tool and the second touch tool is enabled within an enable area (step S504). When at least one of the first touch tool and the second touch tool is enabled within the enable area, a touch light curtain generating unit is controlled to stop generating the light curtain (step S506). Then, when the touch tools are enabled within the enable area, the touch tools are controlled to sequentially emit invisible lights, and images of the touch area are captured to generate a plurality of first capturing images (step S508). Then, touch positions of the touch tools are determined according to the first capturing images obtained when the touch tools emit the invisible lights (step S510). Moreover, when the first touch tool and the second touch tool are not enabled within the enable area, a reflected light generated when the light curtain in the touch area is reflected by a touch object is captured, so as to generate at least one third capturing image (step S512). Then, a touch position of the touch object in the touch area is determined according to the third capturing image (step S514), where the enable area covers the touch area, and the light curtain is located in the enable area.

Figure 6:
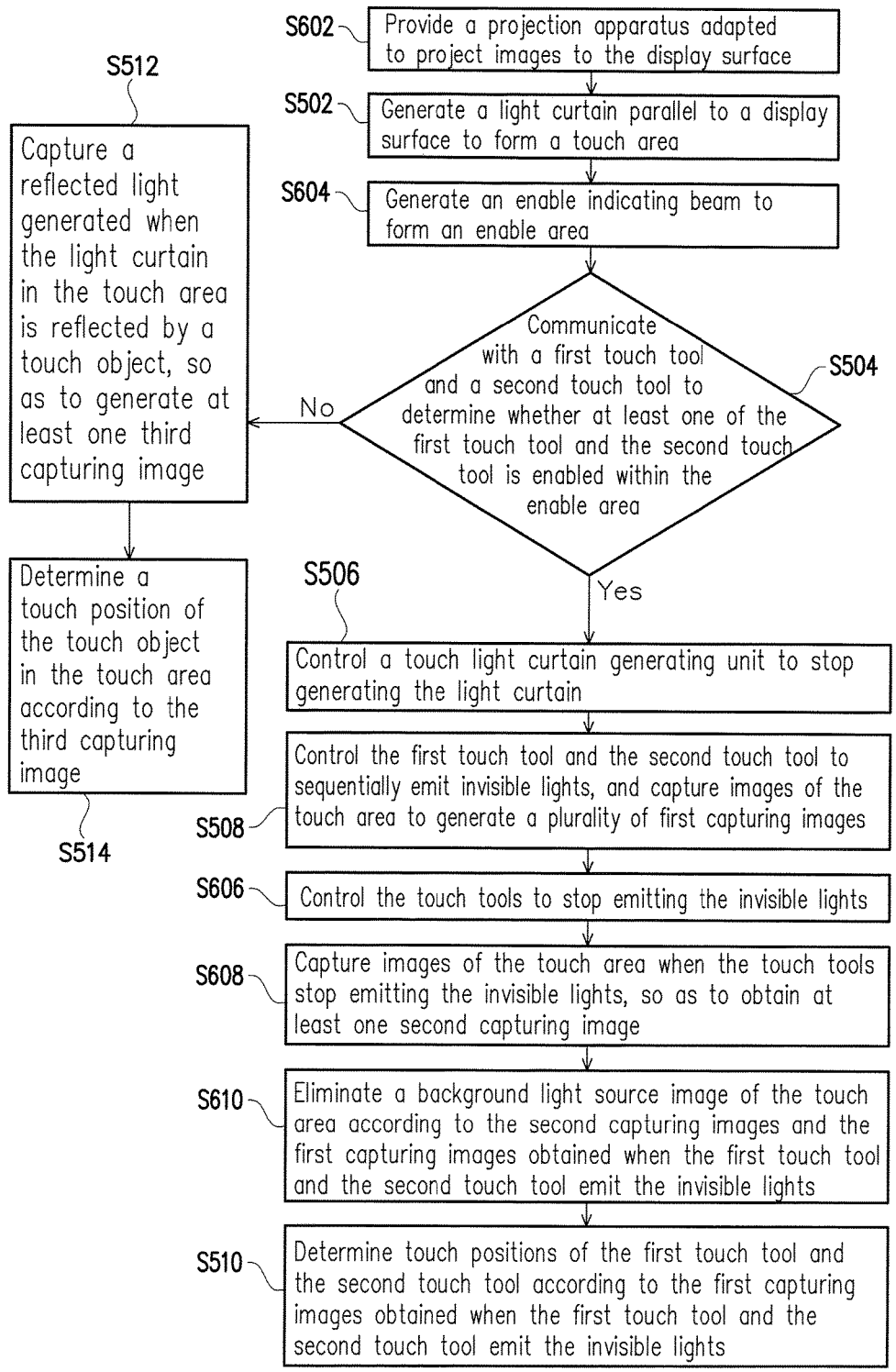
FIG. 6 is a flowchart illustrating a touch display method of a touch display system according to another embodiment of the invention.

FIG. 6 is a flowchart illustrating a touch display method of a touch display system according to another embodiment of the invention. Referring to FIG. 6, in the embodiment, before the step S502, the touch display method of the touch display system further includes a following step. A projection apparatus is provided, where the projection apparatus is configured to project images to the display surface (step S602). Moreover, after the step S502, an enable indicating beam is generated to form the enable area (step S604). In the step S504, it is determined whether one of the first touch tool and the second touch tool is located in the enable area according to whether the first touch tool and the second touch tool receive the enable indicating beam, where when the first touch tool and the second touch tool are located in the enable area, the first touch tool and the second touch tool are enabled. A light wavelength of the light curtain is smaller than a light wavelength of the enable indicating beam, and a light intensity of the enable indicating beam is lower than a light intensity of the light curtain. The enable indicating beam may carry encoding information, and it can be determined whether at least one of the first touch tool and the second touch tool is located in the enable area according to the encoding information. Moreover, after the step S508, the touch tools are controlled to stop emitting the invisible lights (step S606), and images of the touch area are captured when the touch tools stop emitting the invisible lights, so as to obtain at least one second capturing image (step S608), and a background light source image of the touch area is eliminated according to the second capturing images and the first capturing images obtained when the first touch tool and the second touch tool emit the invisible lights (step S610).

In summary, in the embodiment of the invention, by communicating with the first touch tool and the second touch tool, it is determined whether at least one of the first touch tool and the second touch tool is enabled within the enable area. When at least one of the first touch tool and the second touch tool is enabled within the enable area, the touch light curtain generating unit is controlled to stop generating the light curtain, and when the touch tools are enabled, the touch tools are controlled through the communication unit to sequentially emit the invisible lights, so as to determine the touch positions of the touch tools, by which misjudgement of the touch positions is effectively avoided. In some embodiments, the touch tools can be controlled to stop emitting the invisible lights, and the images of the touch area are now captured to obtain at least on second capturing image, and the background light source image of the touch area is eliminated according to the second capturing images and the first capturing images obtained when the touch tools emit the invisible lights, so as to prevent the other infrared light sources in the environment from influencing determination of the touch positions of the touch tools. Moreover, the touch light curtain generating unit only stops generating the light curtain by a period of time when the touch tools capable of emitting the invisible lights enter the enable area, so as to determine the positions of the touch tools emitting the invisible lights in the enable area, and then again generates the light curtain to recover a normal operation. In this way, besides that the touch tools capable of emitting the invisible lights can be used to perform the touch operations, other objects capable of reflecting the light curtain LS can also be simultaneously used to serve as the touch objects, so as to improve usage convenience of the touch display system.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch display system, comprising:
    a display surface;
    a touch light curtain generating unit, adapted to generate a light curtain, wherein the light curtain is parallel to the display surface to form a touch area;
    a first touch tool, adapted to emit an invisible light when the first touch tool performs a touch operation in the touch area;
    a second touch tool, adapted to emit an invisible light when the second touch tool performs a touch operation in the touch area;
    an image capturing unit, adapted to capture images of the touch area when at least one of the first touch tool and the second touch tool emits the invisible light, so as to generate a plurality of first capturing images;
    a communication unit;
    a processing unit coupled to the touch light curtain generating unit, the image capturing unit and the communication unit, and adapted to communicate with the first touch tool and the second touch tool through the communication unit; and an enable area indicating unit, coupled to the processing unit, and adapted to generate an enable indicating beam to form an enable area, wherein a time point for the enable area indicating unit generating the enable indicating beam is earlier than a time point for the touch light curtain generating unit generating the light curtain, so as to prevent the enable indicating beam from influencing determination of touch positions of the first touch tool and the second touch tool, wherein a configuration position of the light curtain is between the enable indicating beam and the display surface in a direction perpendicular to the display surface, and when the first touch tool and the second touch tool are enabled within the enable area, the first touch tool and the second touch tool notify the processing unit through the communication unit, and the processing unit is adapted to control the touch light curtain generating unit to stop generating the light curtain, and controls the first touch tool and the second touch tool through the communication unit to sequentially emit the invisible lights, so as to determine touch positions of the first touch tool and the second touch tool according to the first capturing images.

2. The touch display system of claim 1, wherein the first touch tool and the second touch tool determining whether the first touch tool and the second touch tool are located in the enable area according to whether the first touch tool and the second touch tool receive the enable indicating beam, wherein when the first touch tool and the second touch tool are located in the enable area, the first touch tool and the second touch tool are enabled.

3. The touch display system of claim 2, wherein the enable indicating beam carries encoding information, and the first touch tool and the second touch tool determine whether the first touch tool and the second touch tool are located in the enable area according to the encoding information.

4. The touch display system of claim 2, wherein a light wavelength of the light curtain is smaller than a light wavelength of the enable indicating beam, and a light intensity of the enable indicating beam is lower than a light intensity of the light curtain.

5. The touch display system of claim 1, wherein the enable area covers the touch area, and the light curtain is located in the enable area.

6. The touch display system of claim 1, wherein the processing unit controls the first touch tool and the second touch tool to stop emitting the invisible lights through the communication unit, and controls the image capturing unit to capture images of the touch area when the first touch tool and the second touch tool stop emitting the invisible lights, so as to obtain at least one second capturing image, and the processing unit eliminates a background light source image of the touch area according to the second capturing images and the first capturing images obtained when the first touch tool and the second touch tool emit the invisible lights.

7. The touch display system of claim 1, wherein when the first touch tool and the second touch tool are not enabled within the enable area, the image capturing unit captures a reflected light generated when the light curtain in the touch area is reflected by a touch object, so as to generate at least one third capturing image, and the processing unit determines a touch position of the touch object in the touch area according to the at least one third capturing images.

8. The touch display system of claim 1, further comprising:

a projection apparatus, adapted to project images to the display surface.

9. A touch display method of a touch display system, wherein the touch display system comprises a display surface, the touch display method of the touch display system comprising:

generating a light curtain parallel to the display surface to form a touch area;

communicating with a first touch tool and a second touch tool to determine whether at least one of the first touch tool and the second touch tool is enabled within an enable area;

controlling a touch light curtain generating unit to stop generating the light curtain when at least one of the first touch tool and the second touch tool is enabled within the enable area;

controlling the first touch tool and the second touch tool to sequentially emit invisible lights when the first touch tool and the second touch tool are enabled, and capturing images of the touch area to generate a plurality of first capturing images;

determining touch positions of the first touch tool and the second touch tool according to the first capturing images obtained when the first touch tool and the second touch tool emit the invisible lights;

generating an enable indicating beam to form the enable area, wherein a time point for generating the enable indicating beam is earlier than a time point for the touch light curtain generating unit generating the light curtain, so as to prevent the enable indicating beam from influencing determination of touch positions of the first touch tool and the second touch tool; and generating the light curtain again after touch positions of the first touch tool and the second touch tool are determined, wherein when the at least one of the first touch tool and the second touch tool is enabled within the enable area, time periods of the generating light curtain and time periods of invisible lights emitted by the at least one of the first touch tool and the second touch tool overlap each other, wherein a configuration position of the light curtain is between the enable indicating beam and the display surface in a direction perpendicular to the display surface.

10. The touch display method of the touch display system of claim 9, further comprising:

determining whether at least one of the first touch tool and the second touch tool is located in the enable area according to whether the first touch tool and the second touch tool receive the enable indicating beam, wherein when the first touch tool and the second touch tool are located in the enable area, the first touch tool and the second touch tool are enabled.

11. The touch display method of the touch display system of claim 10, wherein the enable indicating beam carries encoding information, and the touch display method of the touch display system further comprises:

determining whether at least one of the first touch tool and the second touch tool is located in the enable area according to the encoding information.

12. The touch display method of the touch display system of claim 10, wherein a light wavelength of the light curtain is smaller than a light wavelength of the enable indicating beam, and a light intensity of the enable indicating beam is lower than a light intensity of the light curtain.

13. The touch display method of the touch display system of claim 9, wherein the enable area covers the touch area, and the light curtain is located in the enable area.

14. The touch display method of the touch display system of claim 9, further comprising:
controlling the first touch tool and the second touch tool to stop emitting the invisible lights;
capturing images of the touch area when the first touch tool and the second touch tool stop emitting the invisible lights, so as to obtain at least one second capturing image; and
eliminating a background light source image of the touch area according to the second capturing images and the first capturing images obtained when the first touch tool and the second touch tool emit the invisible lights.

15. The touch display method of the touch display system of claim 9, wherein when the first touch tool and the second touch tool are not enabled in the enable area, the touch display method of the touch display system further comprises:
capturing a reflected light generated when the light curtain in the touch area is reflected by a touch object, so as to generate at least one third capturing image; and
determining a touch position of the touch object in the touch area according to the at least one third capturing image.

16. The touch display method of the touch display system of claim 9, further comprising:
providing a projection apparatus, configured to project images to the display surface.

17. A touch device, configured to detect touch positions of at least one of a first touch tool and a second touch tool in a touch area, the touch device comprising:
an image capturing unit, adapted to capture images in the touch area;
a communication unit, coupled to the image capturing unit and wirelessly communicating with the at least one of the first touch tool and the second touch tool;
a touch light curtain generating unit, adapted to generate a light curtain, wherein the light curtain is parallel to a display surface to form the touch area;
an enable area indicating unit, adapted to generate an enable indicating beam to form an enable area, wherein a time point for the enable area indicating unit generating the enable indicating beam is earlier than a time point for the touch light curtain generating unit generating the light curtain, so as to prevent the enable indicating beam from influencing determination of touch positions of the first touch tool and the second touch tool; and
a processing unit, coupled to the touch light curtain generating unit, the enable area indicating unit, the image capturing unit and the communication unit, wherein when the at least one of the first tool and the second tool is enabled in the enable area, the at least one of the first touch tool and the second touch tool notifies the processing unit through the communication unit, and the processing unit is adapted to send a control signal to at least one of the enabled touch tools via the communication unit to control the at least one of the enabled touch tools to emit the invisible light, and the image capturing unit is adapted to capture the invisible light emitted by the at least one of the enabled touch tools, so as to generate a plurality of first capturing images, wherein the first capturing images are used for determining touch positions of the enabled touch tools, wherein a configuration position of the light curtain is between the enable indicating beam and the display surface in a direction perpendicular to the display surface.

18. The touch device of claim 17, wherein the first touch tool and the second touch tool determine whether the first touch tool and the second touch tool are located in the enable area according to whether the first touch tool and the second touch tool receive the enable indicating beam, wherein when the first touch tool and the second touch tool are located in the enable area, the first touch tool and the second touch tool are enabled,
wherein the processing unit communicates with the first touch tool and the second touch tool through the communication unit,
wherein when one of the first touch tool and the second touch tool is enabled within the enable area, the processing unit controls the touch light curtain generating unit to stop generating the light curtain, sends the control signal through the communication unit, and determines touch positions of the first touch tool and the second touch tool according to the first capturing images obtained when the first touch tool and the second touch tool emit the invisible lights.

19. The touch device of claim 18, wherein the enable indicating beam carries encoding information, and the first touch tool and the second touch tool determine whether the first touch tool and the second touch tool are located in the enable area according to the encoding information.

20. The touch device of claim 18, wherein a light wavelength of the light curtain is smaller than a light wavelength of the enable indicating beam, and a light intensity of the enable indicating beam is lower than a light intensity of the light curtain.

21. The touch device of claim 18, wherein the enable area covers the touch area, and the light curtain is located in the enable area.

22. The touch device of claim 18, wherein the processing unit sends the control signal to the first touch tool and the second touch tool through the communication unit, so as to control the first touch tool and the second touch tool to stop emitting the invisible lights, the image capturing unit captures images of the touch area when the first touch tool and the second touch tool stop emitting the invisible lights, so as to obtain at least one second capturing image, and the processing unit eliminates a background light source image of the touch area according to the second capturing images and the first capturing images obtained when the first touch tool and the second touch tool emit the invisible lights.

23. The touch device of claim 18, wherein when the first touch tool and the second touch tool are not enabled in the enable area, the image capturing unit captures a reflected light generated when the light curtain in the touch area is reflected by a touch object, so as to generate at least one third capturing image, and the processing unit determines a touch position of the touch object in the touch area according to the at least one third capturing images.

24. A touch display system, comprising:
a display surface;
a touch light curtain generating unit, adapted to generate a light curtain, wherein the light curtain is parallel to the display surface to form a touch area;
a first touch tool, adapted to emit an invisible light when the first touch tool performs a touch operation in the touch area;

a second touch tool, adapted to emit an invisible light when the second touch tool performs a touch operation in the touch area;

an image capturing unit, adapted to capture images of the touch area when at least one of the first touch tool and the second touch tool emits the invisible light, so as to generate a plurality of first capturing images;

a communication unit;

a processing unit coupled to the touch light curtain generating unit, the image capturing unit and the communication unit, and adapted to communicate with the first touch tool and the second touch tool through the communication unit; and an enable area indicating unit, coupled to the processing unit, and adapted to generate an enable indicating beam to form an enable area, wherein a time point for the enable area indicating unit generating the enable indicating beam is earlier than a time point for the touch light curtain generating unit generating the light curtain, wherein a light wavelength of the light curtain is smaller than a light wavelength of the enable indicating beam, and a light intensity of the enable indicating beam is lower than a light intensity of the light curtain, and when the first touch tool and the second touch tool are enabled within the enable area, the first touch tool and the second touch tool notify the processing unit through the communication unit, and the processing unit is adapted to control the touch light curtain generating unit to stop generating the light curtain, and controls the first touch tool and the second touch tool through the communication unit to sequentially emit the invisible lights, so as to determine touch positions of the first touch tool and the second touch tool according to the first capturing images.

25. A touch display method of a touch display system, wherein the touch display system comprises a display surface, the touch display method of the touch display system comprising:

generating a light curtain parallel to the display surface to form a touch area;

communicating with a first touch tool and a second touch tool to determine whether at least one of the first touch tool and the second touch tool is enabled within an enable area;

controlling a touch light curtain generating unit to stop generating the light curtain when at least one of the first touch tool and the second touch tool is enabled within the enable area;

controlling the first touch tool and the second touch tool to sequentially emit invisible lights when the first touch tool and the second touch tool are enabled, and capturing images of the touch area to generate a plurality of first capturing images;

determining touch positions of the first touch tool and the second touch tool according to the first capturing images obtained when the first touch tool and the second touch tool emit the invisible lights;

generating an enable indicating beam to from the enable area, wherein a time point for generating the enable indicating beam is earlier than a time point for the touch light curtain generating unit generating the light curtain; and generating the light curtain again after touch positions of the first touch tool and the second touch tool are determined, wherein when the at least one of the first touch tool and the second touch tool is enabled within the enable area, time periods of the generating light curtain and time periods of invisible lights emitted by the at least one of the first touch tool and the second touch tool overlap each other, wherein a light wavelength of the light curtain is smaller than a light wavelength of the enable indicating beam, and a light intensity of the enable indicating beam is lower than a light intensity of the light curtain.

26. A touch device, configured to detect touch positions of at least one of a first touch tool and a second touch tool in a touch area, the touch device comprising:

an image capturing unit, adapted to capture images in the touch area;

a communication unit, coupled to the image capturing unit and wirelessly communicating with the at least one of the first touch tool and the second touch tool;

a touch light curtain generating unit, adapted to generate a light curtain, wherein the light curtain is parallel to a display surface to form the touch area;

an enable area indicating unit, adapted to generate an enable indicating beam to form an enable area, wherein a time point for the enable area indicating unit generating the enable indicating beam is earlier than a time point for the touch light curtain generating unit generating the light curtain; and a processing unit, coupled to the touch light curtain generating unit, the enable area indicating unit, the image capturing unit and the communication unit, wherein when the at least one of the first tool and the second tool is enabled in the enable area, the at least one of the first touch tool and the second touch tool notifies the processing unit through the communication unit, and the processing unit is adapted to send a control signal to at least one of the enabled touch tools via the communication unit to control the at least one of the enabled touch tools to emit the invisible light, and the image capturing unit is adapted to capture the invisible light emitted by the at least one of the enabled touch tools, so as to generate a plurality of first capturing images, wherein the first capturing images are used for determining touch positions of the enabled touch tools, wherein a light wavelength of the light curtain is smaller than a light wavelength of the enable indicating beam, and a light intensity of the enable indicating beam is lower than a light intensity of the light curtain.

* * * * *